(12) United States Patent
Kottomtharayil et al.

(10) Patent No.: US 8,706,976 B2
(45) Date of Patent: Apr. 22, 2014

(54) PARALLEL ACCESS VIRTUAL TAPE LIBRARY AND DRIVES

(75) Inventors: Rajiv Kottomtharayil, Marlboro, NJ (US); Manoj K. Vijayan Retnamma, Marlboro, NJ (US); Marcus S. Muller, Tinton Falls, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 664 days.

(21) Appl. No.: 12/202,916

(22) Filed: Sep. 2, 2008

(65) Prior Publication Data

US 2009/0063765 A1    Mar. 5, 2009

Related U.S. Application Data

(60) Provisional application No. 60/969,103, filed on Aug. 30, 2007, provisional application No. 60/969,105, filed on Aug. 30, 2007.

(51) Int. Cl.
*G06F 12/00* (2006.01)
*G06F 13/00* (2006.01)
*G06F 13/28* (2006.01)

(52) U.S. Cl.
USPC ........... 711/150; 711/111; 711/112; 711/162; 711/168; 709/225; 709/227; 707/639

(58) Field of Classification Search
USPC .......... 711/112, 150, 162, 111, 168; 707/639; 709/225, 227
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

U.S. Appl. No. 10/655,764; Inventor: Nourmohamadian et al; filed Sep. 5, 2003.*

(Continued)

*Primary Examiner* — Stephen Elmore
*Assistant Examiner* — Mark Giardino, Jr.
(74) *Attorney, Agent, or Firm* — Perkins Coie LLP

(57) ABSTRACT

A system and method described herein allows a virtual tape library (VTL) to perform multiple simultaneous or parallel read/write or access sessions with disk drives or other storage media, particularly when subject to a sequential SCSI-compliant layer or traditional limitations of VTLs. In one embodiment, a virtualizing or transaction layer can establish multiple sessions with one or more clients to concurrently satisfy the read/write requests of those clients for physical storage resources. A table or other data structure tracks or maps the sessions associated with each client and the location of data on the physical storage devices.

7 Claims, 8 Drawing Sheets

(56) References Cited

U.S. PATENT DOCUMENTS

| | | | |
|---|---|---|---|
| 5,239,647 A | 8/1993 | Anglin et al. |
| 5,241,164 A | 8/1993 | Pavlidis et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,412,668 A | 5/1995 | Dewey |
| 5,448,724 A | 9/1995 | Hayashi et al. |
| 5,455,926 A | 10/1995 | Keele et al. |
| 5,491,810 A | 2/1996 | Allen |
| 5,495,457 A | 2/1996 | Takagi et al. |
| 5,495,607 A | 2/1996 | Pisello et al. |
| 5,499,364 A | 3/1996 | Klein et al. |
| 5,504,873 A | 4/1996 | Martin et al. |
| 5,506,986 A | 4/1996 | Healy |
| 5,544,345 A | 8/1996 | Carpenter et al. |
| 5,544,347 A | 8/1996 | Yanai et al. |
| 5,548,521 A | 8/1996 | Krayer et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,677,900 A | 10/1997 | Nishida et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,815,662 A | 9/1998 | Ong |
| 5,832,522 A | 11/1998 | Blickenstaff et al. |
| 5,860,068 A | 1/1999 | Cook |
| 5,875,478 A | 2/1999 | Blumenau |
| 5,875,481 A | 2/1999 | Ashton et al. |
| 5,887,134 A | 3/1999 | Ebrahim |
| 5,893,139 A | 4/1999 | Kamiyama et al. |
| 5,898,593 A | 4/1999 | Baca et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 5,978,577 A | 11/1999 | Rierden et al. |
| 6,021,415 A | 2/2000 | Cannon et al. |
| 6,026,398 A | 2/2000 | Brown et al. |
| 6,026,414 A | 2/2000 | Anglin |
| 6,052,735 A | 4/2000 | Ulrich et al. |
| 6,076,148 A | 6/2000 | Kedem et al. |
| 6,088,694 A | 7/2000 | Burns et al. |
| 6,094,416 A | 7/2000 | Ying |
| 6,131,095 A | 10/2000 | Low et al. |
| 6,131,099 A | 10/2000 | Johnson et al. |
| 6,131,147 A | 10/2000 | Takagi |
| 6,131,190 A | 10/2000 | Sidwell |
| 6,137,864 A | 10/2000 | Yaker |
| 6,148,412 A | 11/2000 | Cannon et al. |
| 6,154,738 A | 11/2000 | Call |
| 6,154,787 A | 11/2000 | Urevig et al. |
| 6,161,111 A | 12/2000 | Mutalik et al. |
| 6,167,402 A | 12/2000 | Yeager |
| 6,195,794 B1 | 2/2001 | Buxton |
| 6,212,512 B1 | 4/2001 | Barney et al. |
| 6,223,205 B1 | 4/2001 | Harchol-Balter et al. |
| 6,246,882 B1 | 6/2001 | Lachance |
| 6,260,069 B1 | 7/2001 | Anglin |
| 6,266,784 B1 | 7/2001 | Hsiao et al. |
| 6,269,382 B1 | 7/2001 | Cabrera et al. |
| 6,269,431 B1 | 7/2001 | Dunham |
| 6,275,953 B1 | 8/2001 | Vahalia et al. |
| 6,301,592 B1 | 10/2001 | Aoyama et al. |
| 6,304,880 B1 | 10/2001 | Kishi |
| 6,308,245 B1 | 10/2001 | Johnson et al. |
| 6,324,581 B1 | 11/2001 | Xu et al. |
| 6,328,766 B1 | 12/2001 | Long |
| 6,330,570 B1 | 12/2001 | Crighton et al. |
| 6,330,572 B1 | 12/2001 | Sitka |
| 6,330,642 B1 | 12/2001 | Carteau |
| 6,338,006 B1 | 1/2002 | Jesionowski et al. |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,901 B1 | 3/2002 | MacLeod et al. |
| 6,366,900 B1 | 4/2002 | Hu |
| 6,374,336 B1 | 4/2002 | Peters et al. |
| 6,389,432 B1 | 5/2002 | Pothapragada et al. |
| 6,418,441 B1 | 7/2002 | Call |
| 6,418,478 B1 | 7/2002 | Ignatius et al. |
| 6,421,711 B1 | 7/2002 | Blumenau et al. |
| 6,434,682 B1 | 8/2002 | Ashton et al. |
| 6,457,017 B2 | 9/2002 | Watkins et al. |
| 6,484,166 B1 | 11/2002 | Maynard |
| 6,487,561 B1 | 11/2002 | Ofek et al. |
| 6,490,666 B1 | 12/2002 | Cabrera et al. |
| 6,496,744 B1 | 12/2002 | Cook |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,616,047 B2 | 9/2003 | Catan |
| 6,658,436 B2 | 12/2003 | Oshinsky et al. |
| 6,658,526 B2 | 12/2003 | Nguyen et al. |
| 6,662,281 B2 | 12/2003 | Ballard et al. |
| 6,669,832 B1 | 12/2003 | Saito et al. |
| 6,674,924 B2 | 1/2004 | Wright et al. |
| 6,721,334 B1 | 4/2004 | Ketcham |
| 6,757,794 B2 | 6/2004 | Cabrera et al. |
| 6,771,595 B1 | 8/2004 | Gilbert et al. |
| 6,785,078 B2 * | 8/2004 | Basham et al. ............... 360/69 |
| 6,789,161 B1 | 9/2004 | Blendermann et al. |
| 6,802,025 B1 | 10/2004 | Thomas et al. |
| 6,820,035 B1 | 11/2004 | Zahavi |
| 6,851,031 B2 | 2/2005 | Trimmer et al. |
| 6,909,356 B2 | 6/2005 | Brown et al. |
| 6,922,687 B2 | 7/2005 | Vernon |
| 6,934,879 B2 | 8/2005 | Misra et al. |
| 6,941,370 B2 | 9/2005 | Boies et al. |
| 6,950,723 B2 | 9/2005 | Gallo et al. |
| 6,968,351 B2 | 11/2005 | Butterworth |
| 6,968,479 B2 | 11/2005 | Wyatt et al. |
| 6,973,369 B2 | 12/2005 | Trimmer et al. |
| 6,973,553 B1 | 12/2005 | Archibald, Jr. et al. |
| 6,983,351 B2 | 1/2006 | Gibble et al. |
| 7,006,435 B1 | 2/2006 | Davies et al. |
| 7,010,387 B2 | 3/2006 | Lantry et al. |
| 7,012,529 B2 | 3/2006 | Sajkowsky |
| 7,034,683 B2 | 4/2006 | Ghazarian |
| 7,035,880 B1 | 4/2006 | Crescenti et al. |
| 7,058,649 B2 | 6/2006 | Ough et al. |
| 7,069,466 B2 | 6/2006 | Trimmer et al. |
| 7,082,441 B1 | 7/2006 | Zahavi et al. |
| 7,085,786 B2 | 8/2006 | Carlson et al. |
| 7,085,904 B2 | 8/2006 | Mizuno et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,619 B1 | 9/2006 | Rajpurkar et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,118,034 B2 | 10/2006 | Baldassari et al. |
| 7,120,823 B2 | 10/2006 | Foster et al. |
| 7,130,970 B2 | 10/2006 | Devassy et al. |

(56) References Cited

U.S. PATENT DOCUMENTS

| | | | |
|---|---|---|---|
| 7,136,720 B2 | 11/2006 | Deckers | |
| 7,146,377 B2 | 12/2006 | Nowicki et al. | |
| 7,155,465 B2 | 12/2006 | Lee et al. | |
| 7,155,486 B2 | 12/2006 | Aoshima et al. | |
| 7,162,496 B2 | 1/2007 | Amarendran et al. | |
| 7,162,604 B1 * | 1/2007 | Nourmohamadian et al. | 711/168 |
| 7,162,693 B2 | 1/2007 | Yamanaka et al. | |
| 7,191,283 B2 | 3/2007 | Amemiya et al. | |
| 7,197,490 B1 | 3/2007 | English | |
| 7,200,621 B2 | 4/2007 | Beck et al. | |
| 7,203,944 B1 | 4/2007 | van Rietschote et al. | |
| 7,209,949 B2 | 4/2007 | Mousseau et al. | |
| 7,213,118 B2 | 5/2007 | Goodman et al. | |
| 7,216,244 B2 | 5/2007 | Amano | |
| 7,246,140 B2 | 7/2007 | Therrien et al. | |
| 7,246,207 B2 | 7/2007 | Kottomtharayil et al. | |
| 7,246,258 B2 | 7/2007 | Chen et al. | |
| 7,277,246 B2 | 10/2007 | Barbian et al. | |
| 7,277,953 B2 * | 10/2007 | Wils et al. | 709/229 |
| 7,281,032 B2 | 10/2007 | Kodama | |
| 7,287,047 B2 | 10/2007 | Kavuri | |
| 7,293,133 B1 | 11/2007 | Colgrove et al. | |
| 7,343,356 B2 | 3/2008 | Prahlad et al. | |
| 7,343,453 B2 | 3/2008 | Prahlad et al. | |
| 7,343,459 B2 | 3/2008 | Prahlad et al. | |
| 7,346,623 B2 | 3/2008 | Prahlad et al. | |
| 7,346,751 B2 | 3/2008 | Prahlad et al. | |
| 7,379,850 B2 | 5/2008 | Sprogis et al. | |
| 7,395,282 B1 | 7/2008 | Crescenti et al. | |
| 7,395,387 B2 | 7/2008 | Berkowitz et al. | |
| 7,401,728 B2 | 7/2008 | Markham et al. | |
| 7,421,312 B2 | 9/2008 | Trossell | |
| 7,434,090 B2 | 10/2008 | Hartung et al. | |
| 7,447,907 B2 | 11/2008 | Hart, III et al. | |
| 7,454,569 B2 | 11/2008 | Kavuri et al. | |
| 7,467,167 B2 | 12/2008 | Patterson | |
| 7,472,238 B1 | 12/2008 | Gokhale et al. | |
| 7,500,053 B1 | 3/2009 | Kavuri et al. | |
| 7,539,702 B2 | 5/2009 | Deshmukh et al. | |
| 7,539,783 B2 | 5/2009 | Kochunni et al. | |
| 7,581,011 B2 | 8/2009 | Teng | |
| 7,584,227 B2 | 9/2009 | Gokhale et al. | |
| 7,584,298 B2 | 9/2009 | Klinker et al. | |
| 7,587,749 B2 | 9/2009 | Leser et al. | |
| 7,596,586 B2 | 9/2009 | Gokhale et al. | |
| 7,603,518 B2 | 10/2009 | Kottomtharayil | |
| 7,644,245 B2 | 1/2010 | Prahlad et al. | |
| 7,657,666 B2 | 2/2010 | Kottomtharayil et al. | |
| 7,659,820 B2 | 2/2010 | Schnee et al. | |
| 7,660,812 B2 | 2/2010 | Findlay et al. | |
| 7,680,843 B1 | 3/2010 | Panchbudhe et al. | |
| 7,689,510 B2 | 3/2010 | Lamkin et al. | |
| 7,702,659 B2 | 4/2010 | Ban et al. | |
| 7,707,060 B2 | 4/2010 | Chainer et al. | |
| 7,712,094 B2 | 5/2010 | Shapiro | |
| 7,739,450 B2 | 6/2010 | Kottomtharayil | |
| 7,748,610 B2 | 7/2010 | Bell et al. | |
| 7,765,167 B2 | 7/2010 | Prahlad et al. | |
| 7,765,369 B1 | 7/2010 | Prahlad et al. | |
| 7,805,416 B1 | 9/2010 | Compton et al. | |
| 7,809,699 B2 | 10/2010 | Passmore et al. | |
| 7,809,914 B2 | 10/2010 | Kottomtharayil et al. | |
| 7,818,417 B2 | 10/2010 | Ginis et al. | |
| 7,822,715 B2 | 10/2010 | Petruzzo | |
| 7,831,566 B2 | 11/2010 | Kavuri et al. | |
| 7,840,537 B2 | 11/2010 | Gokhale et al. | |
| 7,849,266 B2 | 12/2010 | Kavuri et al. | |
| 7,861,011 B2 | 12/2010 | Kottomtharayil et al. | |
| 7,873,802 B2 | 1/2011 | Gokhale et al. | |
| 7,877,351 B2 | 1/2011 | Crescenti et al. | |
| 7,877,362 B2 | 1/2011 | Gokhale et al. | |
| 7,889,847 B2 | 2/2011 | Gainsboro | |
| 7,890,796 B2 | 2/2011 | Pawar et al. | |
| 7,904,350 B2 | 3/2011 | Ayala et al. | |
| 7,917,473 B2 | 3/2011 | Kavuri et al. | |
| 7,917,695 B2 | 3/2011 | Ulrich et al. | |
| 7,934,071 B2 | 4/2011 | Abe et al. | |
| 7,937,365 B2 | 5/2011 | Prahlad et al. | |
| 7,945,810 B2 | 5/2011 | Soran et al. | |
| 7,953,802 B2 | 5/2011 | Mousseau et al. | |
| 7,969,306 B2 | 6/2011 | Ebert et al. | |
| 7,975,061 B1 | 7/2011 | Gokhale et al. | |
| 7,987,319 B2 | 7/2011 | Kottomtharayil | |
| 8,051,043 B2 | 11/2011 | Young | |
| 2002/0010661 A1 | 1/2002 | Waddington et al. | |
| 2002/0049778 A1 | 4/2002 | Bell et al. | |
| 2002/0069324 A1 | 6/2002 | Gerasimov et al. | |
| 2002/0087950 A1 * | 7/2002 | Brodeur et al. | 717/124 |
| 2003/0055671 A1 | 3/2003 | Nassar | |
| 2003/0065759 A1 | 4/2003 | Britt et al. | |
| 2003/0101155 A1 | 5/2003 | Gokhale et al. | |
| 2003/0134619 A1 * | 7/2003 | Phillips et al. | 455/412 |
| 2003/0220901 A1 | 11/2003 | Carr et al. | |
| 2003/0227707 A1 * | 12/2003 | Kokami et al. | 360/75 |
| 2004/0054607 A1 | 3/2004 | Waddington et al. | |
| 2004/0073677 A1 | 4/2004 | Honma et al. | |
| 2004/0083202 A1 | 4/2004 | Mu et al. | |
| 2004/0107199 A1 | 6/2004 | Dalrymple et al. | |
| 2004/0122832 A1 | 6/2004 | Heil | |
| 2004/0193953 A1 | 9/2004 | Callahan et al. | |
| 2004/0204949 A1 | 10/2004 | Shaji et al. | |
| 2005/0008163 A1 | 1/2005 | Leser et al. | |
| 2005/0021524 A1 | 1/2005 | Oliver | |
| 2005/0033913 A1 | 2/2005 | Kottomtharayil et al. | |
| 2005/0039069 A1 | 2/2005 | Prahlad et al. | |
| 2005/0102203 A1 | 5/2005 | Keong | |
| 2005/0174869 A1 | 8/2005 | Kottomtharayil et al. | |
| 2005/0177828 A1 | 8/2005 | Graham et al. | |
| 2005/0187992 A1 * | 8/2005 | Prahlad et al. | 707/204 |
| 2005/0195660 A1 * | 9/2005 | Kavuri et al. | 365/189.05 |
| 2005/0246342 A1 | 11/2005 | Vernon | |
| 2006/0004639 A1 | 1/2006 | O'Keefe | |
| 2006/0004675 A1 | 1/2006 | Bennett et al. | |
| 2006/0011720 A1 | 1/2006 | Call | |
| 2006/0095385 A1 | 5/2006 | Atkinson et al. | |
| 2006/0161879 A1 | 7/2006 | Lubrecht et al. | |
| 2006/0169769 A1 | 8/2006 | Boyarsky et al. | |
| 2006/0224846 A1 | 10/2006 | Amarendran et al. | |
| 2006/0248165 A1 | 11/2006 | Sridhar et al. | |
| 2006/0282194 A1 | 12/2006 | Schaefer et al. | |
| 2006/0285172 A1 | 12/2006 | Hull et al. | |
| 2007/0130105 A1 | 6/2007 | Papatla | |
| 2007/0156897 A1 | 7/2007 | Lim | |
| 2007/0185912 A1 | 8/2007 | Gupta et al. | |
| 2007/0198722 A1 | 8/2007 | Kottomtharayil et al. | |
| 2007/0198802 A1 | 8/2007 | Kavuri | |
| 2008/0059704 A1 | 3/2008 | Kavuri | |
| 2008/0141242 A1 | 6/2008 | Shapiro | |
| 2008/0229037 A1 | 9/2008 | Bunte et al. | |
| 2008/0243420 A1 | 10/2008 | Gokhale et al. | |
| 2008/0243754 A1 | 10/2008 | Gokhale et al. | |
| 2008/0243795 A1 | 10/2008 | Prahlad et al. | |
| 2008/0243870 A1 | 10/2008 | Muller et al. | |
| 2008/0244177 A1 | 10/2008 | Crescenti et al. | |
| 2008/0249656 A1 | 10/2008 | Gokhale et al. | |
| 2008/0250076 A1 | 10/2008 | Muller et al. | |
| 2008/0320319 A1 | 12/2008 | Muller et al. | |
| 2009/0113056 A1 | 4/2009 | Tameshige et al. | |
| 2009/0313448 A1 | 12/2009 | Gokhale et al. | |
| 2009/0319534 A1 | 12/2009 | Gokhale | |
| 2009/0319585 A1 | 12/2009 | Gokhale | |
| 2010/0070466 A1 | 3/2010 | Prahlad et al. | |
| 2010/0070474 A1 | 3/2010 | Lad | |
| 2010/0070726 A1 | 3/2010 | Ngo et al. | |
| 2010/0082672 A1 | 4/2010 | Kottomtharayil et al. | |
| 2010/0138393 A1 | 6/2010 | Crescenti et al. | |
| 2010/0293112 A1 | 11/2010 | Prahlad et al. | |
| 2011/0087807 A1 | 4/2011 | Kottomtharayil et al. | |
| 2011/0093672 A1 | 4/2011 | Gokhale et al. | |
| 2011/0213755 A1 | 9/2011 | Kavuri et al. | |
| 2011/0231852 A1 | 9/2011 | Gokhale et al. | |
| 2011/0270859 A1 | 11/2011 | Kottomtharayil | |
| 2012/0084523 A1 | 4/2012 | Littlefield et al. | |

(56) References Cited

U.S. PATENT DOCUMENTS

FOREIGN PATENT DOCUMENTS

| EP | 0467546 | 1/1992 |
|---|---|---|
| EP | 0620553 | 10/1994 |
| EP | 0757317 A2 | 2/1997 |
| EP | 0774715 | 5/1997 |
| EP | 0809184 | 11/1997 |
| EP | 0899662 | 3/1999 |
| EP | 0981090 | 2/2000 |
| JP | 7254204 | 10/1995 |
| JP | 9044381 | 2/1997 |
| JP | 9081424 | 3/1997 |
| WO | WO-95/13580 | 5/1995 |
| WO | WO-99/12098 | 3/1999 |
| WO | WO-2005024573 A2 | 3/2005 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 11/269,513, filed Nov. 7, 2005, Prahlad.

Ashton et al., "Two Decades of policy-based storage management for the IBM mainframe computer", www.research.ibm.com, 19 pages, published Apr. 10, 2003, printed Jan. 3, 2009.

Campbell C: "Linux and Windows NT 4.0: Basic Administration—Part III" Internet Publication, [Online] Oct. 5, 2000, Retrieved from the Internet: URL: <http://linux.omnipotent.net/article.php?article_id=10933> [retrieved on Aug. 22, 2006], 6 pages.

Carrington D: "Backups Using the "at" Command", Internet Publication, [Online] May 4, 1999, Retrieved from the Internet: URL: <http://groups.google.de/group/microsoft.public.windowsnt.misc/browse_thread/thread/d1406a9a8391afea/48bac300a0adcc7a?lnk=st&q=&rnum=12&hl=de#48bac300a0adcc7a> [retrieved on Aug. 2, 2006], 1 page.

Cook P: "ntbackup: eject tape at end of backup?" Internet Publication, [Online] Oct. 18, 2000, Retrieved from the Internet: URL: <http://groups.google.de/group/microsoft.public.windowsnt.misc/browse_thread/thread/8f67f0cc96df42b7/0ab1d93a6f91b511?lnk=st&g=%22ntbackup+eject%22+at&rnum=1&hl=de#0ab1d93a6f91b511> [retrieved on Aug. 22, 2006], 1 page.

Gonzalez-Seco, Jose, "A Genetic Algorithm as the Learning Procedure for Neural Networks," International Joint Conference on Neural Networks, Jun. 1992, 356 pages.

MDM: "Automatically eject tape", Internet Publication, [Online] Jun. 7, 1999, Retrieved from Internet: URL: <http://groups.google.de/group/microsoftpublic.windowsnt.misc/browse_thread/thread/66537271a88cebda/2f8b1b96dfc5f102?lnk=st&q=&rnum=11&hl=de#2f8b1b96dfc5f102> [retrieved on Jun. 22, 2006], 1 page.

Recycle Bin (Windows), Aug. 2007, Wikipedia, pp. 1-3.

Savill J: "Windows NT FAQ Single File Version—Section Backup's" Internet Publication, [Online] 2000, Retrieved from Internet: URL: <http://burks.bton.ac.uk/burks/pcinfo/osdocs/ntfag/ntfaq_09.htm> [retrieved on Aug. 22, 2006], 8 pages.

U.S. Appl. No. 13/432,852, filed Mar. 28, 2012, Gokhale.

U.S. Appl. No. 09/609,977, filed Jul. 5, 2000, Prahlad.

Allen, "Probablility, Statistics and Queuing Theory," (1978), p. 370, col. 19, Lines 3-33, 1 page.

\* cited by examiner

Virtual Tape/Disk Table

| Client | Session | Drive | Media | Storage Device ID | Block ID | |
|---|---|---|---|---|---|---|
| Client 1 | Handle 1 | Drive 1 | Bar Code 1 | Drive 1 | Bock ID 1 | |
| Client 2 | Handle 2 | Drive 2 | Bar Code 2 | Drive 1 | Bock ID 2 | |
| Client 1 | Handle 3 | Drive 1 | Bar Code 3 | Drive 1 | Bock ID 3 | |
| Client 3 | Handle 4 | Drive 3 | Bar Code 4 | Tape 1 | Offset ID 4 | |
| Client 1 | Handle 5 | Drive 2 | Bar Code 5 | Drive 2 | Bock ID 5 | |
| | | | | | | |
| | | | | | | |

*FIG. 4*

PARALLEL ACCESS VIRTUAL TAPE LIBRARY AND DRIVES

CROSS-REFERENCE TO RELATED APPLICATION(S)

This application claims the benefit of the assignee's U.S. Provisional Patent Application Nos. 60/969,103 and 60/969,105, both filed Aug. 30, 2007.

BACKGROUND

Virtual tape libraries (VTL) transform disk drives into virtual tape to improve backup/restore times, as well as to provide other benefits. A VTL operates by providing a layer or interface between a host or client computer and a disk drive system. This VTL layer acts like one or more tape drives with one or more tapes or pieces of media and mimics commands to and from the client computer to make the client believe that it is communicating with tape drives. Instead, however, the VTL actually exchanges data with one or more disk drives.

A Jan. 3, 2007 article by B. Pariseau in ComputerWeekly.com, entitled, "Storage Outlook '07: In Search of Better Data Management," indicates that some consumers prefer tape and VTL because drives capable of up to 4 to 1 compression save storage resources. According to the article, > The VTL improves upon some of the traditional limitations with physical tape libraries. With VTLs [one] can create hundreds of virtual tape drives. Each server can have its own dedicated drives, reducing the complexity of shared resources. The SCSI tape protocol has some downsides shared by both VTL and physical tape . . . . Neither enables concurrent reads from the same volume by two separate hosts. This means tape replication for [data recovery] and restores cannot happen at the same time.

Tape by its nature is sequential and thus does not permit simultaneous read operations from different locations on a given tape. Disk drives, however, do permit simultaneous read and write commands. But, as noted above, a VTL forces the disk drive to operate like a tape drive and thus does not permit concurrent reads, or other capabilities incompatible with tape. Many limitations of VTLs exist because of a lack of disk management solutions or limitations in backup software applications that employ VTLs. For example, when a write command is provided to a drive, the VTL reserves that drive and no other commands can be performed.

The need exists for a system that overcomes the above problems, as well as providing additional benefits. Overall, the examples herein describe some prior or related systems, and their associated limitations are intended to be illustrative and not exclusive. Other limitations related to existing or prior systems will become apparent to those of skill in the art upon reading the following Detailed Description.

BRIEF DESCRIPTION OF THE DRAWINGS

FIG. 4 is a virtual tape/disk table for use by the components of FIG. 2A.

Figure 1:
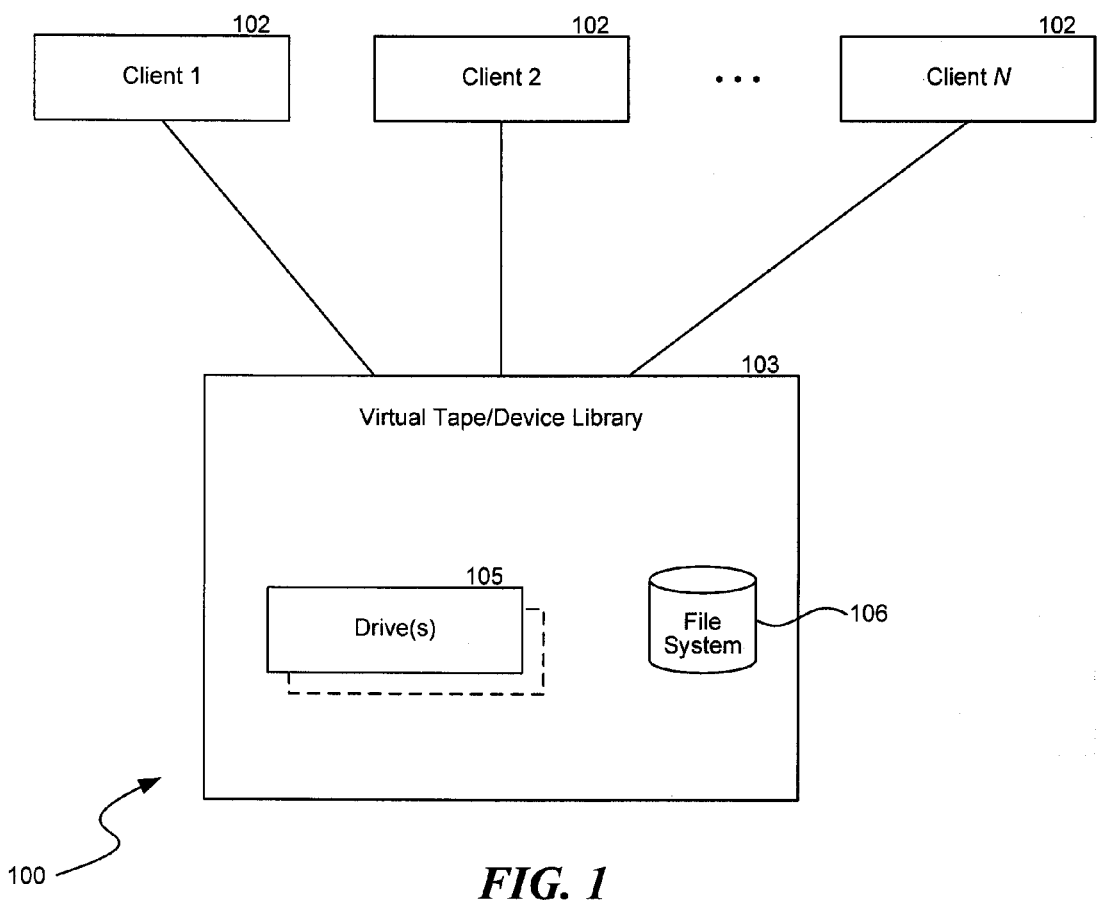
FIG. 1 is a block diagram illustrating an example of a VTL or parallel access virtual tape library and drives system.

In the drawings, the same reference numbers and acronyms identify elements or acts with the same or similar functionality for ease of understanding and convenience. To easily identify the discussion of any particular element or act, the most significant digit or digits in a reference number generally refers to the Figure number in which that element is first introduced (e.g., element 310 is first introduced and discussed with respect to FIG. 3).

DETAILED DESCRIPTION

Various examples of the invention will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description.

Described in detail herein is a system that allows a VTL to perform multiple simultaneous or parallel read/write or access sessions with disk drives or other storage media, particularly when subject to a sequential SCSI-compliant layer or the traditional limitations of VTLs. In one embodiment described in detail herein, a virtualizing or transaction layer can establish multiple sessions with one or more clients to concurrently satisfy the read/write requests of those clients for physical storage resources. A table or other data structure then tracks or maps the sessions associated with each client and the location of data on the physical storage devices. The table may also identify virtual drives, virtual media, or other information, such as load data, content data, etc.

Referring to FIG. 1, an example of a parallel access virtual tape library and drive system 100 is shown. One or more client computers or hosts 102 communicate with a virtual tape or device library 103 that includes one or more disk drives 105. As explained in more detail below, the VTL 103 looks like one or more tape drives to the client, but in fact the VTL 103 employs disk drives and/or other non-sequential storage media. Indeed, the VTL 103 operates like existing virtual tape libraries, except as explained herein.

The VTL 103 causes a tape drive to show up at the operating system level of each client computer. The VTL 103 exposes multiple handles, addresses, or other APIs to the operating systems of each client computer, so that any application on those clients can use the (virtual) tape drive to perform any desired functions, including read or write commands. In this example, the VTL 103 employs one or more disk drives that effectively have a tape command front end that accepts commands through standard protocols, such as standard sequential SCSI protocols. The VTL 103 may employ standard file system-type disk management, such as Dynamic Disk-like functionality under Microsoft® Windows®, to dynamically grow or shrink allocated or available disk space for each session under this example (shown as file system 107).

Figure 2A:
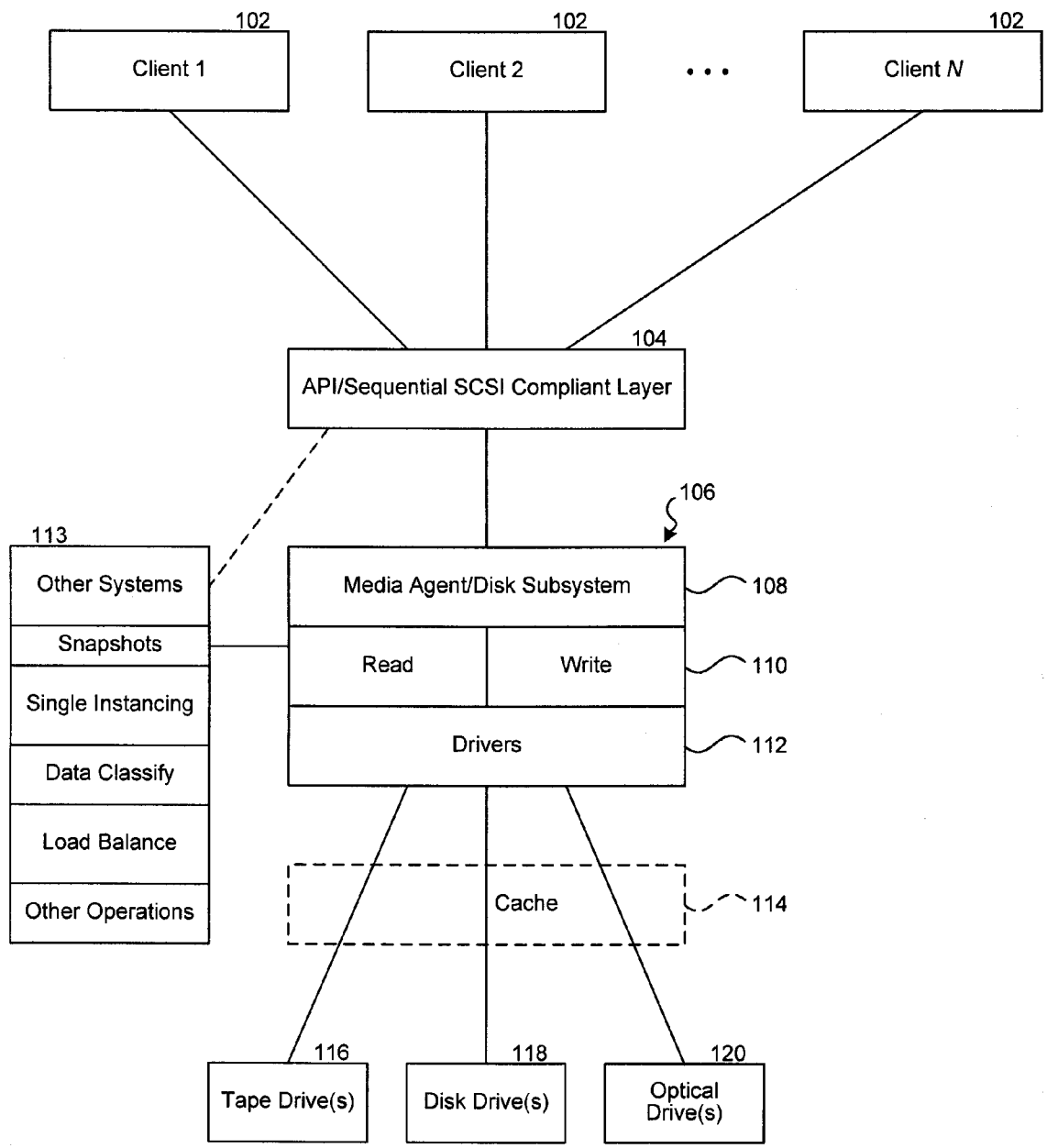
FIG. 2A is a block diagram illustrating an alternate embodiment of the system shown in FIG. 1.

Referring to FIG. 2A, an example of an alternative to the VTL 103 embodiment of FIG. 1 is shown as having an API or sequential SCSI-compliant layer 104 that communicates with both the clients and a lower layer 106, which includes a media agent/disk subsystem 108. The media agent/disk subsystem 108 may communicate with read and write processes 110 that receive and pass to drivers 112 read/write commands initiated by the clients. Data associated with these read/write commands may be cached in an optional intermediate cache 114, or may flow directly to one or more tape drives 116, one or more disk drives 118, one or more optical drives 120 (collectively, drives 116, 118, 120), or other data storage media and devices not shown. To the client computers 102, the system appears as mounted tape, but instead the media agent/disk subsystem 108 operates routines that receive blocks of data and store and manage them with respect to any form of secondary storage. This permits, for example, client 1 to write commands to a virtual tape drive at the same time that client 2 is reading from it.

The lower layer 106 operates, as known by those skilled in the relevant art, to implement communications and functions with data storage devices so as to satisfy read, write, or other data storage commands. Media agents may be employed to execute necessary subroutines for accessing appropriate drives, loading media, performing any necessary data manipulation (e.g., encryption/decryption, compression/decompression, error correction, de-duplication (often involving cryptographic hashing), etc.). The disk subsystem may include an associated file management system (not shown) that can include one or more file access tables (FAT) or other data structures for tracking locations of data stored on particular data storage drives 116, 118, 120. Note that the system may dynamically change the allocation of blocks of data on each drive 105, 116, 118, and/or 120, to permit greater flexibility and improve performance of the system. Note also that when multiple commands for the same tape, i.e., tape drive 116, are received, they may be stored temporarily in cache 114. The lower layer 106 can, for example, provide multiple concurrent lines of data flow to or from one or more disk drives 118. Note that the lower layer 106 provides access to multiple data storage media types, e.g., drives 116, 118, 120, even though the system receives tape drive commands from a client or host computer.

The media agent/disk subsystem 108 may communicate with other systems 113 so that data or commands from the clients receive further processing to provide further benefits. Such other operations can include snapshots, single instancing/de-duplication, data classification, load balancing, or other data management and data storage techniques, some of which are described in detail herein.

Figure 2B:
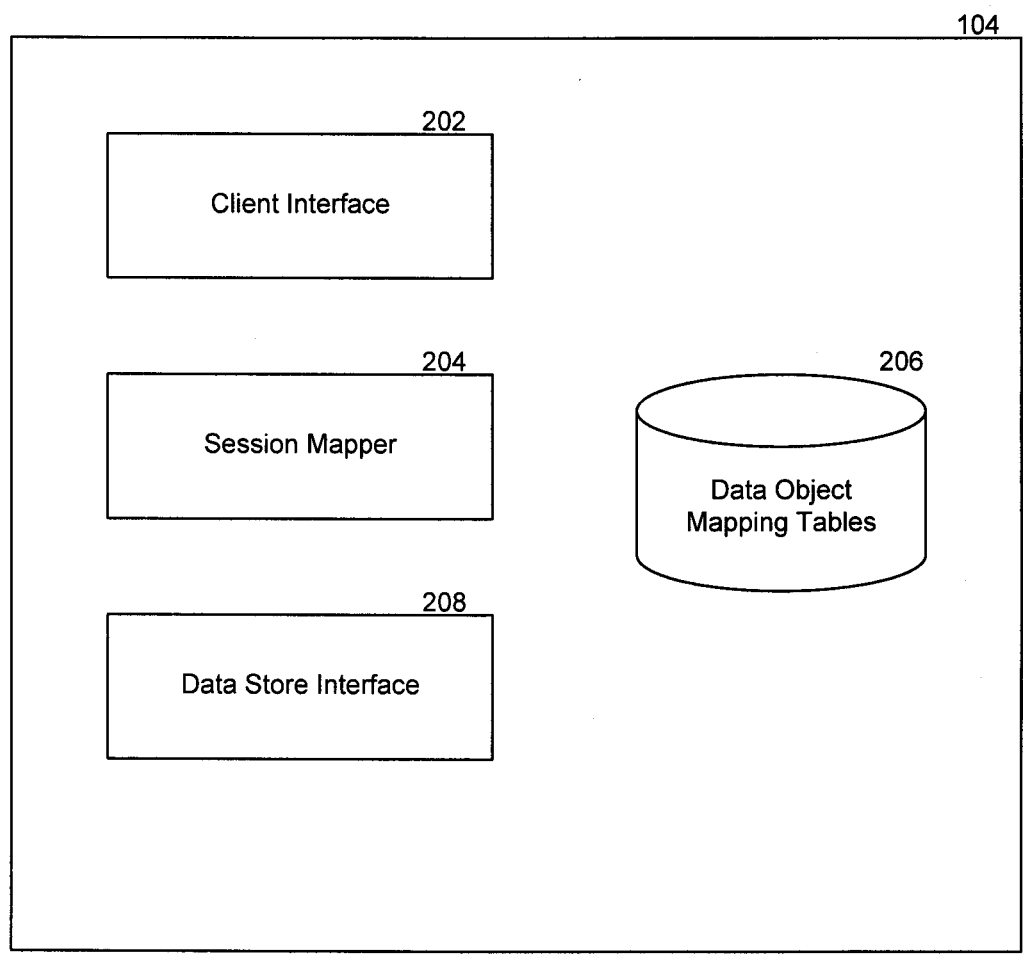
FIG. 2B is a block diagram illustrating components of an API or sequential SCSI-compliant layer shown in FIG. 2A.

Referring to FIG. 2B, layer 104 includes a client interface 202 that receives read/write commands from the clients and passes them on to other components. For example, a session mapper 204 receives the read/write commands and responds by associating a session handle with each read/write request. The client interface 202 then passes the session handle to the appropriate client. The session mapper 204 also builds one or more data object mapping tables 206 to track read/write commands with session handles and physical locations of data written to and read from one or more drives or storage devices 105, 116, 118, and/or 120 (as described above with reference to FIGS. 1-2A). A data store interface 208 interfaces with these drives to implement the read/write commands.

The client interface 202 exposes a sequential SCSI interface (e.g., tape interface or API), or similar sequential media interface to any application running on the client computers. The client interface 202 thus accepts read/write commands like a typical tape drive. The data store interface 208 then passes standard VTL commands to any secondary storage device (via lower layer 106). Layer 104 of FIG. 2B acts as a standard VTL, but receive commands are based on sessions created and associated with received client commands via session mapper 204. In other words, an SCSI interface is provided on top of a file input/output handler.

Under an alternative implementation, components of FIG. 2A may be combined to form a storage appliance, similar to Network Attached Storage (NAS). Thus, within a single enclosure, components 104, 106, 113, 114, and one or more storage devices 116, 118, 120 can be combined to provide an appliance to client computers 102. Layer 104 can include a file system interface to provide uniform access to the appliance for the client's 102, while avoiding specific APIs, or sequential SCSI compliant commands. (The APIs of layer 104 can be specifically tailored for individual VTLs in the example above.) Thus, the file system of layer 104 will include uniform naming conventions and APIs through the file system, and provide client with a common or uniform interface (e.g., UNIX, Windows, etc.). The media agent/disc subsystem 106 is an independent component to help handle various processes that may be performed by the appliance, including snapshots, single instancing, data compression/decompression, data encryption/decryption, and other processes described herein.

Figure 3:
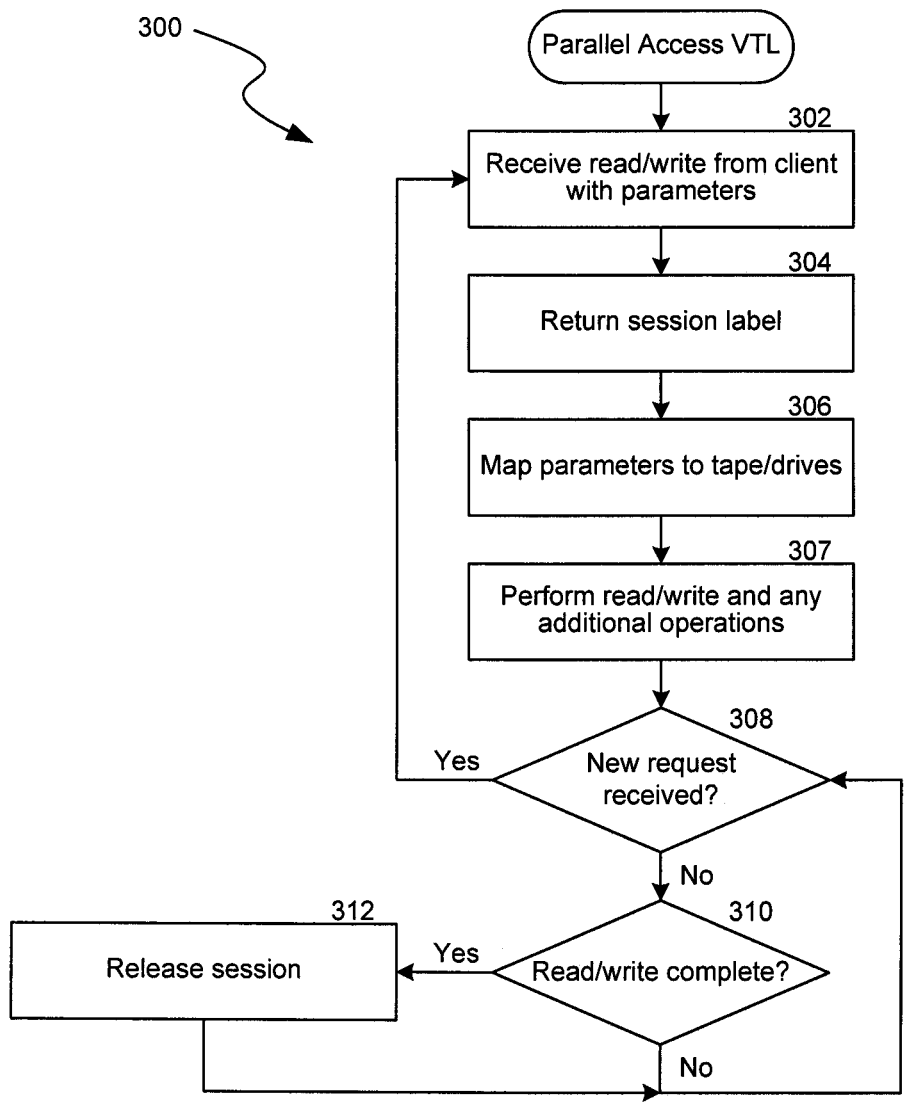
FIG. 3 is a flow diagram illustrating an example of a routine for performing parallel access virtualization.

FIG. 3 shows an example of a flow diagram illustrating VTL or virtualization routine 300. Beginning in block 302, the system receives read/write commands from a client, along with associated parameters. The parameters can indicate or specify a particular tape drive, media (typically identified by a barcode number), or possibly an offset, data size, etc. While barcodes are shown in this example, any identifier may be employed to identify, e.g., a desired disk. In block 304, the system returns a session label to the client, which the client then uses for subsequent association with that request. If the same media is requested by two different clients, then a different session handle is provided to each client.

While a session-based example is described herein, alternatively or additionally the system may employ a threaded architecture. Under a threaded architecture, the system could employ one or more threads to handle different requests from the same client. A multi-threaded architecture may be implemented at the operating system level to cater to multiple client requests simultaneously, where, e.g., Windows provides such access through APIs. The system described herein, in this example, creates threads via the specific Windows APIs. Each client may still be given a client session, where a thread is a parallel request. So multiple sessions can run in parallel, as assisted by the use of multiple threads under Windows.

In block 306, the system maps the received request and parameters to storage devices, as described below with respect to FIG. 4. In block 307, the system performs the read/write commands with respect to one or more drives and performs any additional operations, such as snapshotting, single instancing, data classification, load balancing, or other processes, described herein.

In decision block 308, the system determines whether a new request has been received. If so, the routine returns to block 302. If not, then in decision block 310 the system determines whether the read/write operation has been complete. If not, the routine moves back to 308; else, the session is released in block 312.

Referring to FIG. 4, an example of a virtual tape/disk table is shown. While a table is shown, any data structure may be employed. Here, the system provides a mapping for received read/write commands to associated physical data storage resources. For example, a "Client 1" provides a read/write command to the system and receives in return a session handle "Handle 1." Parameters received from Client 1 include identification of a tape drive and media, "Drive 1" and "Barcode 1." The system then maps that command to a particular storage device and block ID, which in this example is "Drive 1" and "Block ID 1," and which can refer to a particular magnetic disk drive and one or more blocks on that drive.

Similar examples are evidenced from the table of FIG. 4. Note that Client 1 provides two additional requests, which are associated with "Handle 3" and "Handle 5," where Handle 3 requests (tape) Drive 1 and media or Barcode 3, but the system maps that request to Drive 1 and Block ID 3. The system can provide simultaneous read/write commands to multiple clients and for different identified drives and media, or even for the same drives and media, despite the limitations of prior VTL technology. Of course, many more entries may exist in the table, and the table grows and shrinks dynamically as sessions are created and released.

As noted above, the system can provide other processing of the data under block 307. This can include, for example, performing characteristic analysis, such as data classification for data passing through the system. Further details regarding data classification may be found in the assignee's U.S. Patent Application No. 60/752,203, entitled "Systems and Methods for Classifying and Transferring Information in a Storage Network". The system can also perform content indexing, which is described in the assignee's U.S. patent application Ser. No. 11/694,869, filed 30 Mar. 2007, entitled "Method and System for Offline Indexing of Content and Classifying Stored Data". Further, the system can perform single instancing or deduplication, such as is described in the assignee's U.S. Patent Application No. 60/871,737, filed 22 Dec. 2006, entitled "System and Method for Storing Redundant Information". Further, the system can provide load balancing operations among the one or more secondary storage drives 116, 118, 120, and dynamically allocate streams of data to and from such drives, as is described in further detail in the assignee's copending U.S. patent application Ser. No. 11/615,800, filed 22 Dec. 2006, entitled "Systems and Methods of Data Storage Management, Such as Dynamic Data Stream Allocation". Note that the present system allows multiple data processing techniques to be employed in a virtual tape library. The system can perform many of various data processing and data storage management techniques before or during the writing (or reading) of data to the secondary storage drives 116, 118, 120.

One example of the type of further processing that may be utilized is the implementation of snapshots. Snapshots are a type of data backup known to those skilled in the relevant art. A snapshot driver, in this example, creates a snapshot of a disk drive, such as "Drive 1" referred to in FIG. 4, which has data from Clients 1 and 2 written to it. Multiple snapshots may be created over a period of time, with each snapshot associated with a particular time they were created. A user may then access a list or table of snapshots and select a point in time to which the user may wish to roll back and view an image of the disk at that specific time (based on when the selected snapshot was created). Each of the snapshots would store not only a bitmap image of the disk, but also the table that indicates block identifications or locations where data for each client is stored. Therefore, the system can identify those blocks associated with Client 1 and re-create an image of the data or disk based on the user-selected snapshot. Note that this snapshot represents (virtual tape. Thus, snapshots may be applied to a VTL under this example.

As long as snapshots are taken sequentially over a period of time and associated with the time at which those snapshots were taken, a user may be able to roll back and view the state of a virtual tape drive for a particular client at any time that a snapshot was created. The system can provide a user interface that allows a user to browse through the available snapshots. Alternatively or additionally, the system can store copies of each data object mapping table, such as the table of FIG. 4. If the time associated with each snapshot is added as another column to the table, the user can simply use such stored tables to identify a desired snapshot. Furthermore, if the table tracks individual files and times associated with snapshots, then a user may be able to obtain earlier versions of particular files by obtaining the appropriate bitmap associated with a client and file from the snapshot and pulling up the desired file copy. In other words, the system has granularity down to the file level assuming that the locations of individual files for each client on the secondary storage (e.g., disk 118) are tracked in the table.

Other operations, such as additional reads or writes, may be performed simultaneously on Drive 1. Thus, one operation may be performed while another is simultaneously performed. A read operation, for example, may be performed simultaneously with a replication of that same data, or a write operation for a particular data object being done simultaneously with replication of that data (albeit to a different portion of a particular drive or other drive of the system).

Another alternative is to employ an effectively unmodified VTL, and instead allow two drives to mount the same media. Traditionally, a VTL allows only one client to read or access a given tape drive and a given piece of media at one point of time. In this alternative, one or more clients may specify two or more drives. However, those clients would also specify the same media to be accessed. The VTL would then permit two or more simultaneous reads of that data back to the clients. In other words, under this alternative, an existing VTL would expose the same drive twice, such as to two different clients.

Under this alternative, the VTL itself will be able to do parallel or non-sequential SCSI commands, where two clients may request, e.g., reads at the same time for the same media. Again, sessions would be employed, but within the VTL. So, in one example each client/user session has a read request in each session, which may be mapped to non-sequential access on the same disk. Each client gains access to a tape drive and issues sequential reads in each session, which then become multiple random accesses on the disk. A middle layer converts these multiple sessions sequentially into random access on the disk and returns the clients responses as sequential reads. (This middle layer is in the VTL in this alternative, as opposed to that described in the system above, but similar operations occur.) Overall, each client believes it has requested and received a sequential read, but internally it is random access to the disk.

Such an alternative would require only minor or no modifications to existing VTLs to permit such functionality. For example, changes may be required to client-side applications that use the VTL. The client-side application using the VTL will have to manage its own requests to the VTL, e.g., requests to mount media in a different drive and to know that the drive is actually using that media, regardless of requests by other clients. With an unmodified VTL, the application must be modified e.g., to know that it is reading media already mounted in another drive.

In this alternative, a drawback would be that the client would have to do some management on its own to track the media. For example, the application's regular operation or logic requires that if one tape is already being used by a drive, then it cannot be used by another drive. Here, the application would need to modify that logic so that even if a certain tape is being used by one client, it could mount the same tape in a different drive.

Alternatively or additionally, minor modifications to the VTL may be implemented. Normally, if a given piece of media is already mounted in a drive, the VTL does not allow that media to be mounted to a different drive. So, here, a minor modification to the VTL would be to simply allow it to mount the same media to a different drive.

Yet another alternative is to expose the file system employed by the VTL. By providing access to the VTL file system (via appropriate APIs), simultaneous reads of data identified in the VTL file system may be performed. VTLs typically do not expose their underlying file system, i.e., how they store data on the disk, etc., but instead just provide a sequential access interface (e.g., sequential SCSI interface), which does not describe exactly how files are laid on disk by the VTL file system. In other words, the VTL completely manages, and completely hides, how files are managed and distributed by the VTLs internal disk drive(s).

If the VTL file system instead were opened up (via appropriate APIs, like in Microsoft Windows), simultaneous reads, writes, and other access may be provided, as described herein. However, such an alternative would require a VTL manufacturer or VTL subsystem to open up the underlying file system, which may require the manufacturer to manage multiple, concurrent write sessions, etc., thus potentially expanding the required scope of modification.

Suitable System

Figure 5:
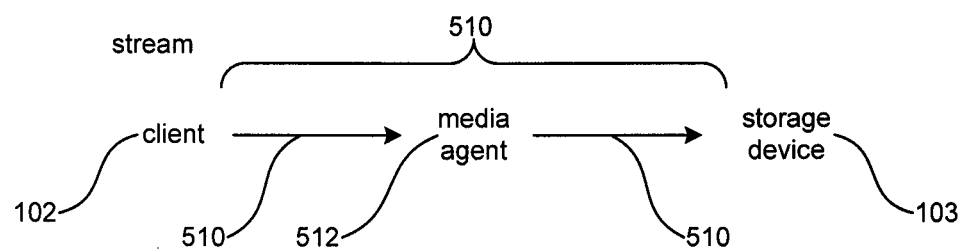
FIG. 5 is a block diagram illustrating components of a data stream that may be used in a suitable data storage system.

The above parallel access VTL system may be incorporated within a data storage system and may be subjected to a data stream during a data copy operation. Referring to FIG. 5, a block diagram illustrating components of a data stream 510 utilized by a suitable data storage and recovery system is shown. The data stream 510 may include client 102, a media agent 512, and a secondary storage device, such as VTL 103. For example, in storage operations, the system may store, receive, and/or prepare data to be stored, copied, or backed up at a server or client. The system may then transfer the data to be stored to media agent 512, which may then refer to storage policies, schedule policies, and/retention policies (and other policies) to choose a secondary storage device. The media agent 512 may include or be associated with an intermediate component, to be discussed herein.

The secondary storage device receives the data from the media agent 512 and stores the data as a secondary copy, such as a backup copy. Secondary storage devices may be magnetic tapes, optical disks, USB and other similar media, disk, and tape drives, and so on. Of course, the system may employ other configurations of data stream components not shown in FIG. 6.

Figure 6:
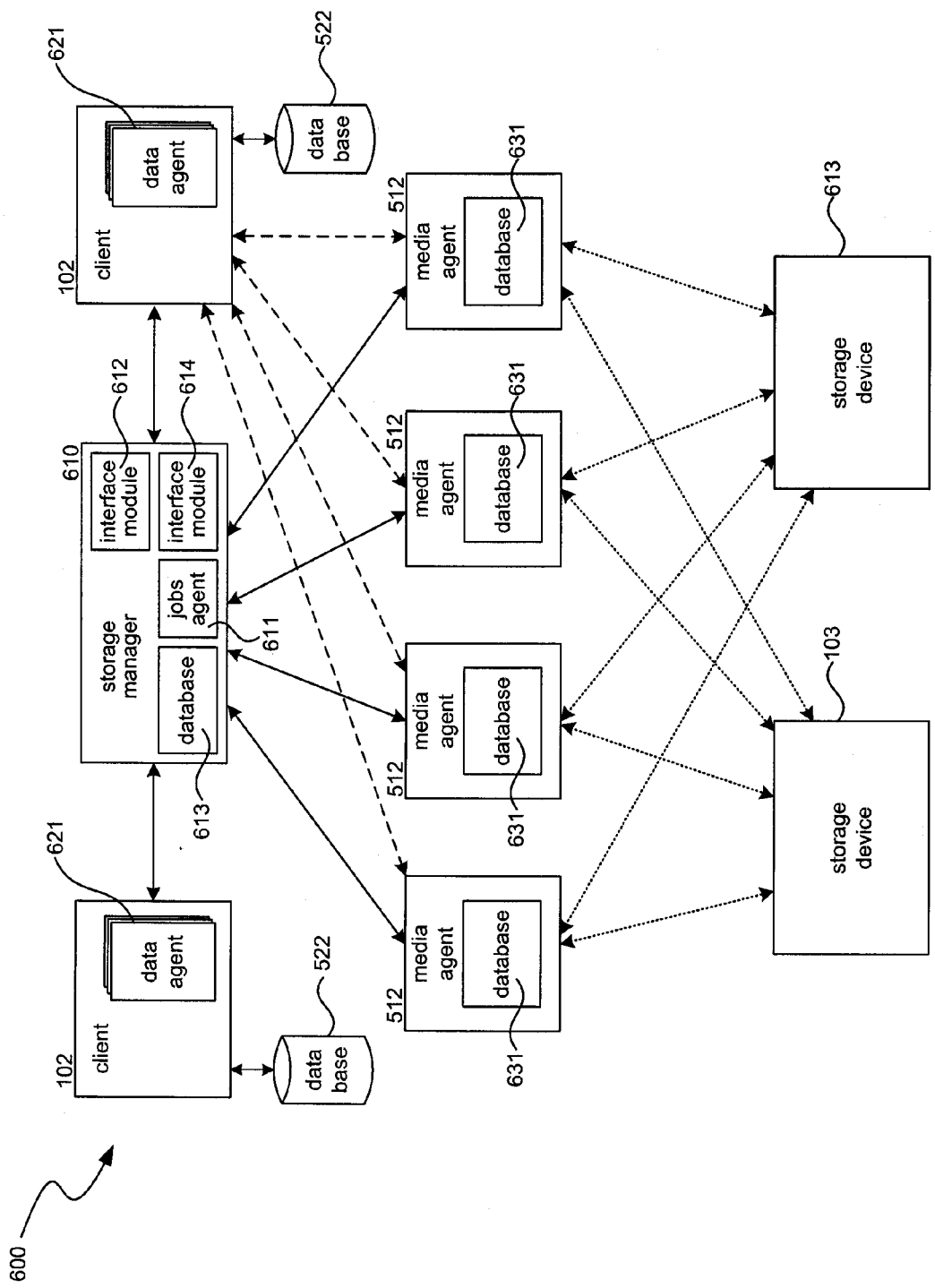
FIG. 6 is a block diagram illustrating an example of a data storage system.

Referring to FIG. 6, a block diagram illustrating an example of a data storage and recovery system 600 is shown. Data storage systems may contain some or all of the following components, depending on the needs of the system. FIG. 6 and the discussion herein provide a brief, general description of a suitable computing environment in which the system can be implemented.

For example, the data storage system 600 contains a storage manager 610, one or more clients 102, one or more media agents 512, and one or more storage devices 103, 613. Storage manager 610 controls media agents 512, which may be responsible for transferring data to storage devices. Storage manager 610 includes a jobs agent 611, a management agent 612, a database 613, and/or an interface module 614. Storage manager 610 communicates with client(s) 102. One or more clients may access data that is stored by the system from database 622 via a data agent 621. The system uses media agents 512, which contain databases 631, to transfer and store data into storage devices. Client databases 622 may contain data files and other information, while media agent databases 631 may contain indices and other data structures that assist and implement the storage of data in secondary storage devices, for example.

The data storage and recovery system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. Additionally, some resources may create indices and other tables relied upon by the data storage system and other data recovery systems. The secondary copies may include snapshot copies and associated indices, but may also include other backup copies such as HSM copies, archive copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store, or copy data from a source to a data store, such as storage media. Storage policies may be stored in storage manager 610, or may be stored in other resources, such as a global manager, a media agent, and so on. Further details regarding storage management and resources for storage management will now be discussed.

Figure 7:
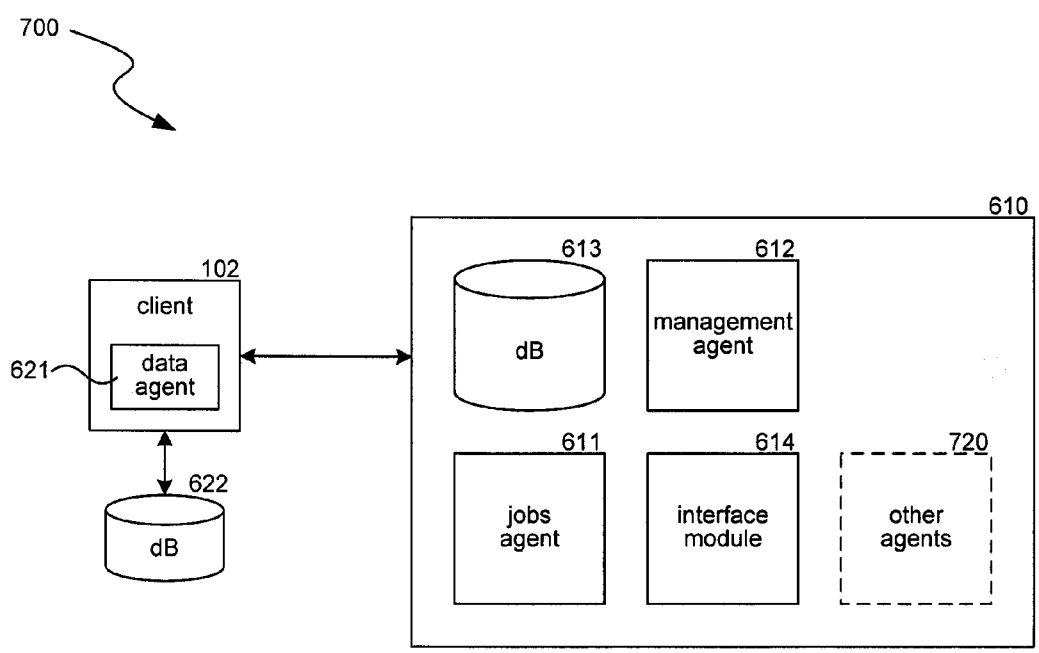
FIG. 7 is block diagram illustrating an example of components of a server used in data storage operations.

Referring to FIG. 7, a block diagram illustrating an example of components of a server or system 700 used in data storage operations is shown. A server, such as storage manager 610, may communicate with clients 102 to determine data to be copied to storage media. As described above, the storage manager 610 may contain a jobs agent 611, a management agent 612, a database 613, an interface module 614, and/or other agents 720. Jobs agent 611 may manage and control the scheduling of jobs (such as copying data files) from clients 102 to media agents 512 (not shown). Management agent 612 may control the overall functionality and processes of the data storage system or may communicate with global managers. Database 613 or another data structure may store storage policies, schedule policies, retention policies, or other information, such as historical storage statistics, storage trend statistics, and so on. Interface module 615 may interact with a user interface, enabling the system to present information to administrators and receive feedback or other input from the administrators or with other components of the system (such as via APIs).

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, handheld devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6, will begin with the words "means for".) Accordingly, the applicant reserves the right to add additional claims after filing the application to pursue such additional claim forms for other aspects of the invention.

We claim:

1. A computer-implementable method of processing commands for a virtual tape library (VTL), wherein the VTL receives sequential access write commands from two or more host computers, and wherein the VTL reads data from or writes data to at least two random access data storage devices within the VTL, the method comprising:
   intercepting sequential access write commands from the two or more host computers, wherein the sequential access write commands from the two or more host computers are commands to write data to sequential data storage media,
      wherein each sequential access write command includes associated parameters, and wherein the associated parameters specify a particular sequential access data storage drive and a piece of removable, sequential access, data storage media;
   in response to each intercepted sequential access write command from the two or more host computers, returning a session identifier to each host computer,
      wherein if the same piece of removable, sequential access, data storage media is requested by two different host computers, then a different session handle is provided to each of the two different host computers, and
      wherein if the same sequential access data storage drive is requested by two different host computers, then a different session handle is provided to each of the two different host computers;
   tracking, via a data structure, the session identifiers, the parameters, the at least two random access data storage devices within the VTL, and each intercepted sequential access write command from the two or more host computers;
   in response to each intercepted sequential access write command from the two or more host computers, performing write commands with respect to the at least two random access data storage devices within the VTL;
   determining whether any of the intercepted sequential access write commands have been completed;
   if any one of the intercepted sequential access write commands has been completed, then releasing a session associated with a completed sequential access write command; and
   generating multiple snapshots of the data structure, wherein each of the multiple snapshots is generated at a different time; and
   providing a user interface for displaying and permitting user access to data associated with each of the multiple snapshots.

2. The computer-implementable method of claim 1, further comprising:
   in response to intercepted sequential access write commands, assigning one or more threads to manage different write requests from the same host computer.

3. The computer-implementable method of claim 1, further comprising:
   performing at least one additional data storage operation on data to be written to the at least two random access data storage devices within the VTL, wherein the additional data storage operation is single instancing, classifying data, load balancing, or generating snapshots.

4. The computer-implementable method of claim 1, further comprising:
   generating multiple snapshots of the at least two random access data storage devices within the VTL, wherein each of the multiple snapshots is generated at a different time; and
   providing a user interface for displaying and permitting user access to data associated with each of the multiple snapshots.

5. A non-transitory computer-readable medium containing code, which when executed by a computer causes a virtual tape library (VTL) to perform a method to permit parallel access to two or more drives associated with the VTL, the method comprising:
   intercepting sequential access write commands from two or more host computers, wherein the sequential access write commands from the two or more host computers are commands to write data to sequential data storage media,
      wherein each sequential access write command includes associated parameters, and wherein the associated parameters specify a particular sequential access data storage drive and a piece of removable, sequential access, data storage media;
   in response to each intercepted sequential access write command from the two or more host computers, returning a session identifier to each host computer,
      wherein if the same piece of removable, sequential access, data storage media is requested by two different host computers, then providing a different session handle to each of the two different host computers, and
      wherein if the same sequential access data storage drive is requested by two different host computers, then providing a different session handle to each of the two different host computers;
   tracking, via a data structure, the session identifiers, the parameters, the at least two random access data storage devices within the VTL, and each intercepted sequential access write command from the two or more host computers;
   in response to each intercepted sequential access write command from the two or more host computers, performing write commands with respect to the at least two random access data storage devices within the VTL;
   determining whether any of the intercepted sequential access write commands have been completed;
   if any one of the intercepted sequential access write commands has been completed, then releasing a session associated with a completed sequential access write command; and
   generating multiple snapshots of the data structure, wherein each of the multiple snapshots is generated at a different time; and
   providing a user interface for displaying and permitting user access to data associated with each of the multiple snapshots.

6. The computer-readable medium of claim 5, wherein the method further comprises:
   in response to intercepted sequential access write commands, assigning one or more threads to manage different write requests from the same host computer.

7. The computer-readable medium of claim 5, wherein the method further comprises:
   performing at least one additional data storage operation on data to be written to the at least two random access data storage devices within the VTL, wherein the additional data storage operation is single instancing, classifying data, load balancing, or generating snapshots.

* * * * *